US010445577B2

(12) United States Patent
Ouchi et al.

(10) Patent No.: US 10,445,577 B2
(45) Date of Patent: Oct. 15, 2019

(54) INFORMATION DISPLAY METHOD AND INFORMATION DISPLAY TERMINAL

(71) Applicant: Maxell, Ltd., Kyoto (JP)

(72) Inventors: Satoshi Ouchi, Tokyo (JP); Yoshiho Seo, Tokyo (JP); Yuya Ogi, Tokyo (JP); Tomoto Kawamura, Tokyo (JP); Toshiteru Nakamura, Tokyo (JP)

(73) Assignee: Maxell, Ltd., Kyoto (JP)

( * ) Notice: Subject to any disclaimer, the term of this patent is extended or adjusted under 35 U.S.C. 154(b) by 0 days.

(21) Appl. No.: 15/302,005

(22) PCT Filed: Apr. 8, 2014

(86) PCT No.: PCT/JP2014/060217
§ 371 (c)(1),
(2) Date: Oct. 5, 2016

(87) PCT Pub. No.: WO2015/155841
PCT Pub. Date: Oct. 15, 2015

(65) Prior Publication Data
US 2017/0116479 A1    Apr. 27, 2017

(51) Int. Cl.
*G06K 9/00* (2006.01)
*G06F 1/16* (2006.01)
(Continued)

(52) U.S. Cl.
CPC ......... *G06K 9/00671* (2013.01); *G06F 1/163* (2013.01); *G06F 3/012* (2013.01);
(Continued)

(58) Field of Classification Search
CPC . G06F 3/01; G06F 1/163; G06F 3/012; G06F 3/013; G06F 3/0481;
(Continued)

(56) References Cited

U.S. PATENT DOCUMENTS 6,346,929 B1 * 2/2002 Fukushima ............. G06F 3/013
345/156
6,636,249 B1 * 10/2003 Rekimoto ............... G06F 3/002
345/419
(Continued)

FOREIGN PATENT DOCUMENTS

CN    102946591 A    2/2013
JP    2001-290720 A   10/2001
(Continued)

OTHER PUBLICATIONS

International Search Report of PCT/JP2014/060217 dated Jun. 24, 2014.
(Continued)

*Primary Examiner* — Michael J Jansen, II
(74) *Attorney, Agent, or Firm* — Mattingly & Malur, PC

(57) ABSTRACT

An information display terminal includes an arithmetic unit performing a process that selects a predetermined type of communication unit among a plurality of types of communication units on the basis of, for example, information related to first objects recognized from a captured image, which is stored in advance, and acquires the related information from a predetermined device on the Internet through the communication unit and a process that, when the presence of a second object or a predetermined positional relationship between the first objects and the second object is specified in the captured image, displays the related information of the first objects in a viewing direction, using a display unit.

22 Claims, 10 Drawing Sheets

(51) Int. Cl.
| | |
|---|---|
| *G06F 3/01* | (2006.01) |
| *G06F 3/147* | (2006.01) |
| *G06F 3/042* | (2006.01) |
| *G09G 3/00* | (2006.01) |
| *G06F 3/0488* | (2013.01) |
| *G06Q 30/02* | (2012.01) |

(52) U.S. Cl.
CPC .......... *G06F 3/013* (2013.01); *G06F 3/0425* (2013.01); *G06F 3/04886* (2013.01); *G06F 3/147* (2013.01); *G09G 3/001* (2013.01); *G06Q 30/0235* (2013.01); *G09G 2340/10* (2013.01); *G09G 2354/00* (2013.01); *G09G 2370/022* (2013.01); *G09G 2380/04* (2013.01)

(58) Field of Classification Search
CPC ............ G06F 3/04812; G06F 3/04815; G06F 3/04817; G06F 3/04886; G06F 3/147; G06F 3/0425; G06K 9/00382; G06K 9/00671; G06Q 30/0235; H04N 7/185; G02B 27/0172; G02B 27/017; G02B 2027/0178; G09G 3/001; G09G 2380/04; G09G 2370/022; G09G 2354/00; G09G 2340/10

See application file for complete search history.

(56) References Cited

U.S. PATENT DOCUMENTS

| | | | | |
|---|---|---|---|---|
| 6,965,570 | B2* | 11/2005 | Takekawa | H04B 17/318 370/241 |
| 8,368,794 | B2* | 2/2013 | Sako | A61B 5/0013 348/333.01 |
| 8,494,212 | B2* | 7/2013 | Yamada | G02B 6/0006 382/100 |
| 8,863,183 | B2* | 10/2014 | Kutaragi | H04N 21/2743 382/118 |
| 8,896,685 | B2* | 11/2014 | Ihara | G08G 1/04 348/116 |
| 9,330,196 | B2* | 5/2016 | Luna | G06F 17/30902 |
| 9,603,049 | B2* | 3/2017 | Alisawi | H04W 76/10 |
| 9,791,948 | B2* | 10/2017 | Sako | G06F 3/011 |
| 9,927,613 | B2* | 3/2018 | Nakamura | G02B 27/0172 |
| 9,990,034 | B2* | 6/2018 | Lee | G09G 3/003 |
| 10,019,962 | B2* | 7/2018 | Liu | G09G 5/00 |
| 10,187,620 | B2* | 1/2019 | Kobori | G02B 26/101 |
| 2001/0011010 | A1* | 8/2001 | Takekawa | H04B 17/318 455/67.11 |
| 2007/0132663 | A1 | 6/2007 | Iba et al. | |
| 2010/0013739 | A1* | 1/2010 | Sako | G06F 3/0484 345/8 |
| 2011/0158478 | A1* | 6/2011 | Yamada | G02B 6/0006 382/103 |
| 2012/0191542 | A1* | 7/2012 | Nurmi | A61B 5/16 705/14.54 |
| 2012/0284356 | A1* | 11/2012 | Luna | G06F 17/30902 709/213 |
| 2013/0010103 | A1* | 1/2013 | Ihara | G08G 1/04 348/116 |
| 2013/0027430 | A1* | 1/2013 | Matsuda | G06F 3/011 345/633 |
| 2013/0036438 | A1* | 2/2013 | Kutaragi | H04N 21/2743 725/38 |
| 2013/0044128 | A1* | 2/2013 | Liu | G09G 5/00 345/633 |
| 2013/0085345 | A1* | 4/2013 | Geisner | G06Q 30/00 600/300 |
| 2015/0023162 | A1* | 1/2015 | Alisawi | H04W 76/10 370/230 |
| 2015/0067366 | A1* | 3/2015 | Lai | G06F 1/3293 713/320 |
| 2015/0227222 | A1* | 8/2015 | Sako | G06F 3/011 345/173 |
| 2015/0309400 | A1* | 10/2015 | Kawamura | G03B 21/2013 353/31 |
| 2016/0041396 | A1* | 2/2016 | Kawamura | G02B 27/0176 345/8 |
| 2016/0109931 | A1* | 4/2016 | Kobayashi | G06F 1/3265 345/212 |
| 2016/0131909 | A1* | 5/2016 | Nakamura | G02B 27/0172 345/8 |
| 2016/0226985 | A1* | 8/2016 | Yoon | H04L 67/2861 |
| 2016/0255316 | A1* | 9/2016 | Kobori | G02B 26/101 348/746 |
| 2016/0291691 | A1* | 10/2016 | Lee | G09G 3/003 |
| 2016/0313560 | A1* | 10/2016 | Kawamura | G02B 27/0172 |
| 2016/0320622 | A1* | 11/2016 | Yoshida | G06F 3/14 |
| 2017/0116479 | A1* | 4/2017 | Ouchi | G06K 9/00671 |

FOREIGN PATENT DOCUMENTS

| | | |
|---|---|---|
| JP | 2007-163634 A | 6/2007 |
| JP | 2008-065169 A | 3/2008 |
| JP | 2008-185609 A | 8/2008 |
| JP | 2010-021878 A | 1/2010 |
| JP | 2011-028763 A | 2/2011 |

OTHER PUBLICATIONS

Chinese Office Action received in corresponding Chinese Application No. 201480077827.0 dated Sep. 3, 2018.

* cited by examiner

FIG. 4

| ID | TYPE | NAME | COMMUNICATION ENVIRONMENT | RECOGNITION TEMPLATE 1 | ... |
|---|---|---|---|---|---|
| 00001 | STORE | ○○WEAR | STORE WIRELESS LAN | 123.dat | ... |
| 00002 | STORE | ○○FOOD | BUILDING WIRELESS LAN | 456.dat | ... |
| 00003 | ARTICLE | ABC ONE-PIECE DRESS OF ○○BRAND | NEAR FIELD WIRELESS COMMUNICATION | 789.dat | ... |
| 00004 | FAST FOOD STORE | --- | --- | 101.dat | ... |
| ... | ... | ... | ... | ... | ... |

125

F I G . 5

| UNIT ID | COMMUNICATION TYPE | COMMUNICABLE DISTANCE | POWER CONSUMPTION | PRIORITY | ... |
|---|---|---|---|---|---|
| T001 | WIRELESS LAN | 10 m | LARGE | 3 | ... |
| T002 | MOBILE PHONE | 1 km OR MORE | MEDIUM | 2 | ... |
| T003 | NEAR FIELD WIRELESS COMMUNICATION | 10 cm | SMALL | 1 | ... |
| ... | ... | ... | ... | ... | ... |

INFORMATION DISPLAY METHOD AND INFORMATION DISPLAY TERMINAL

TECHNICAL FIELD

The present invention relates to an information display method and an information display terminal.

BACKGROUND ART

In recent years, the sense of existence of a so-called wearable information display terminal that displays predetermined information using a goggle-type or glasses-type head-mounted display has increased. In addition, various methods for controlling or using the wearable information display terminal have been proposed. That is, for example, a technique (see Patent Document 1) has been proposed which automatically switches modes (a summary mode or a detail mode) for displaying information on a display element according to the behavior state of a user detected by a sensor in a head-mounted information display device that includes the display element device in order to display information suitable for the behavior state of the user.

In addition, an information processing terminal (see Patent Document 2) has been proposed which combines information that is associated with a current position or an object and is given by a user with an image captured by an imaging means and displays the image. The information processing terminal includes a means for combining information that is given to a real-world situation specified by positional information or a real-world situation specified by identified object information by the user with an image and displaying the image and a means for transmitting the information given by the user to an information processing device such that the information is stored in a database of the information processing device.

CITATION LIST

Patent Document

Patent Document 1: JP 2007-163634 A
Patent Document 2: JP 2011-28763 A

SUMMARY OF THE INVENTION

Problems to be Solved by the Invention

A wearable information display terminal has a higher unity with the user than a smart phone or a tablet terminal since it is wearable and enables the user to keep looking at a display screen with ease and stability, regardless of movement or operation.

In a case in which information is transmitted to the information display terminal such that the information display terminal displays the information or a case in which an image is captured and displayed by the information display terminal, when the user positively performs a display control operation, for example, whether to perform display, the frequency of display, or a display time is likely to be matched with the user's intention.

In this situation, the user is likely to strongly feel the trouble that arbitrary information is continuously displayed rather than the advantages of the wearable information display terminal. In addition, there is a concern that communication with the outside in order to acquire display information will be frequently and constantly performed.

Further more, in an information display terminal in which battery capacity is limited to the size of the terminal, the available time is likely to be significantly reduced. In addition, there is a concern that a communicate fee will increase with an increase in communication time.

An object of the invention is to provide a technique that can improve the comfort and/or convenience of a user when a terminal is used.

Solutions to Problems

In order to achieve the above-mentioned object, according to the invention, there is provided an information display method that is performed in an information display terminal including an imaging unit that captures an image in a viewing direction of a wearer, a display unit that displays information in the viewing direction, and a plurality of types of communication units that communicate with a network or another terminal which can access the network. The information display method includes: an information acquisition process that recognizes a first object in the image captured by the imaging unit according to a predetermined criterion, selects a predetermined type of communication unit among the plurality of types of communication units on the basis of at least one of information related to the first object which is stored in advance and predetermined detection information which is obtained from a predetermined element, accesses the network or another terminal through the communication unit, and acquires the related information of the first object from the network on the basis of identification information recognized from the first object; and an information display process that, when the presence of a second object or a predetermined positional relationship between the first object and the second object is determined or specified in the image captured by the imaging unit, displays the acquired related information of the first object in the viewing direction, using the display unit.

According to the invention, there is provided an information display method that is performed in an information display terminal including a display unit that displays information in a viewing direction of wearer, a plurality of types of communication units that communicate with a network or another terminal which can access the network, a posture detection unit that detects a posture of the information display terminal, a positioning unit that measures a current position of the information display terminal, and a storage unit that stores map information. The information display method includes: an information acquisition process that recognizes an object which the wearer of the information display terminal faces on a map as a first object on the basis of the current position of the information display terminal obtained from the positioning unit, a direction of the information display terminal obtained from the posture detection unit, and the map information, selects a predetermined type of communication unit among the plurality of types of communication units on the basis of at least one of information related to the first object which is stored in advance and predetermined detection information which is obtained from a predetermined element, accesses the network or another terminal through the communication unit, and acquires the related information of the first object from the network on the basis of identification information recognized from the first object; and an information display process that measures a time for which the wearer faces the first object and displays the acquired related information of the first object in the viewing direction using the display unit when the measured time is equal to or greater than a predetermined value.

According to the invention, there is provided an information display terminal including: an imaging unit that captures an image in a viewing direction of a wearer; a display unit that displays information in the viewing direction; a plurality of types of communication units that communicate with a network or another terminal which can access the network; and an arithmetic unit performing a process that recognizes a first object in the image captured by the imaging unit according to a predetermined criterion, selects a predetermined type of communication unit among the plurality of types of communication units on the basis of at least one of information related to the first object which is stored in advance and predetermined detection information which is obtained from a predetermined element, accesses the network or another terminal through the communication unit, and acquires the related information of the first object from the network on the basis of identification information recognized from the first object and a process that, when the presence of a second object or a predetermined positional relationship between the first object and the second object is determined or specified in the image captured by the imaging unit, displays the acquired related information of the first object in the viewing direction, using the display unit.

According to the invention, there is provided an information display terminal including: a display unit that displays information in a viewing direction of wearer; a plurality of types of communication units that communicate with a network or another terminal which can access the network; a posture detection unit that detects a posture of the information display terminal; a positioning unit that measures a current position of the information display terminal; a storage unit that stores map information; and an arithmetic unit performing a process that recognizes an object which the wearer of the information display terminal faces on a map as a first object on the basis of the current position of the information display terminal obtained from the positioning unit, a direction of the information display terminal obtained from the posture detection unit, and the map information, selects a predetermined type of communication unit among the plurality of types of communication units on the basis of at least one of information related to the first object which is stored in advance and predetermined detection information which is obtained from a predetermined element, accesses the network or another terminal through the communication unit, and acquires the related information of the first object from the network on the basis of identification information recognized from the first object and a process that measures a time for which the wearer faces the first object and displays the acquired related information of the first object in the viewing direction using the display unit when the measured time is equal to or greater than a predetermined value.

Effects of the Invention

According to the invention, the wearable information display terminal can match the time or frequency of information display with the user's intention and reduce a terminal operation time and/or a communication fee. As a result, it is possible to improve the comfort and/or convenience of the user when the terminal is used.

BRIEF DESCRIPTION OF THE DRAWINGS

FIG. 4 is a diagram illustrating an example of an object information table in the first embodiment.

FIG. 5 is a diagram illustrating an example of a communication unit information table in the first embodiment.

MODE FOR CARRYING OUT THE INVENTION

Embodiment 1

Figure 1:
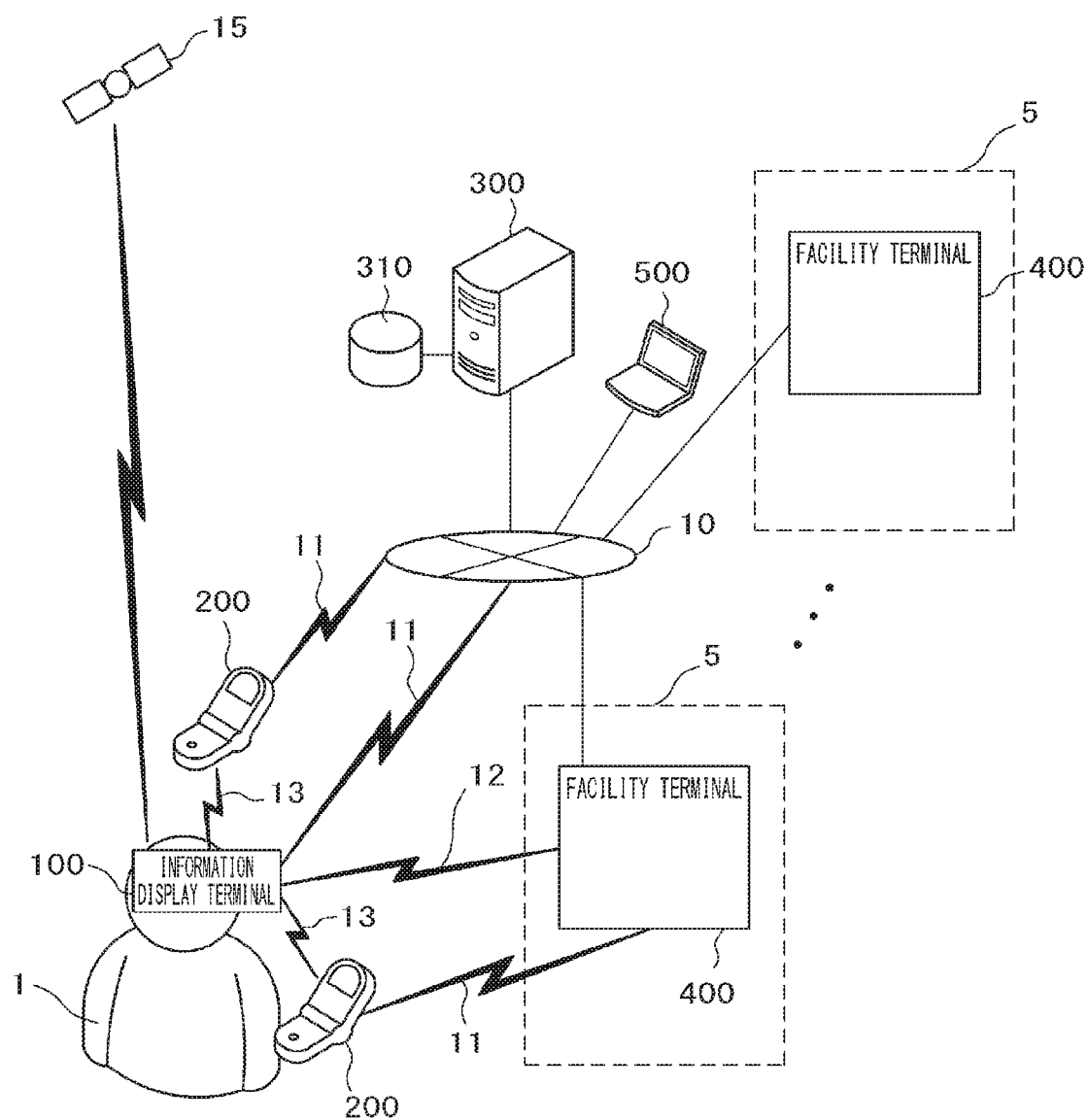
FIG. 1 is a diagram illustrating an example of the configuration of a network including an information display terminal according to a first embodiment.

Hereinafter, an embodiment of the invention will be described in detail with reference to the drawings. FIG. 1 is a diagram illustrating an example of the configuration of a network including an information display terminal 100 according to a first embodiment. The information display terminal 100 illustrated in FIG. 1 is a wearable information display terminal, matches the time or frequency of information display with the user's intention, reduces a terminal operating time or a communication free, and improves the comfort or convenience of the user when the terminal is used.

The information display terminal 100 is, for example, a small terminal that is mounted to the head of a user 1 like a head-mounted display, directly follows the orientation direction of the user 1, and can capture the images of various objects in the viewing direction of the user 1. In addition, the information display terminal 100 displays information related to a candidate object (first object), which is specified by a predetermined criterion among the objects, on a display that is made of a transparent material in front of the eyes of the user 1, in response to an appropriate trigger.

The information display terminal 100 includes a plurality of types of communication units, selectively uses the communication units according to a situation in which the information display terminal 100 is placed, and communicates with, for example, a server 300 which is an information distribution source or a facility terminal 400 in a facility 5, which is an object to acquire the related information.

In the network configuration illustrated in FIG. 1, the server 300 provides information about each object, which is stored in a storage 310, that is, information related to the candidate object to the information display terminal 100 through an Internet 10. In addition, for example, a personal computer 500 operated by a person who has knowledge about the object or the facility terminal 400 operated by a person who is in charge of each object, such as a store or a public facility, can be assumed as the device that provides the related information to the server 300. Of course, in addition to the operation form in which the server 300 collectively stores the related information, information which is opened to the public by unspecified devices connected to the Internet 10 may be used as the related information.

The related information which is provided to the server 300 in advance is, for example, information useful to the user 1 who is interested in each object, such as sales information in a store, discount coupons, exhibition content in public facilities, or free admission tickets.

As described above, the information display terminal 100 includes a plurality of types of communication units. However, the information display terminal 100 does not always respond to the communication environment in which the user 1 is placed.

For example, when the information display terminal 100 includes a near field communication unit and does not include a mobile phone unit, the information display terminal 100 is not capable of being connected to a wide area communication network, such as the Internet 10, and acquiring the related information from the server 300. It is assumed that the user 1 has a mobile phone 200 including a near field communication unit. In this case, the information display terminal 100 can be connected to the mobile phone 200 by near field communication 13 and can be connected to the Internet 10 through a mobile phone network 11, using the mobile phone 200 as a router.

Alternatively, it is assumed that the user 1 has a mobile phone 200 including a near field communication unit and a wireless LAN unit. In addition, it is assumed that the device which provides the related information is a facility terminal 400 which has not been connected to a wide area communication network such as the Internet 10. In this case, the information display terminal 100 can be connected to the mobile phone 200 by the near field communication 13 and can be connected to the facility terminal 5 through the wireless LAN 12, using the mobile phone 200 as a wireless LAN unit.

Figure 2:
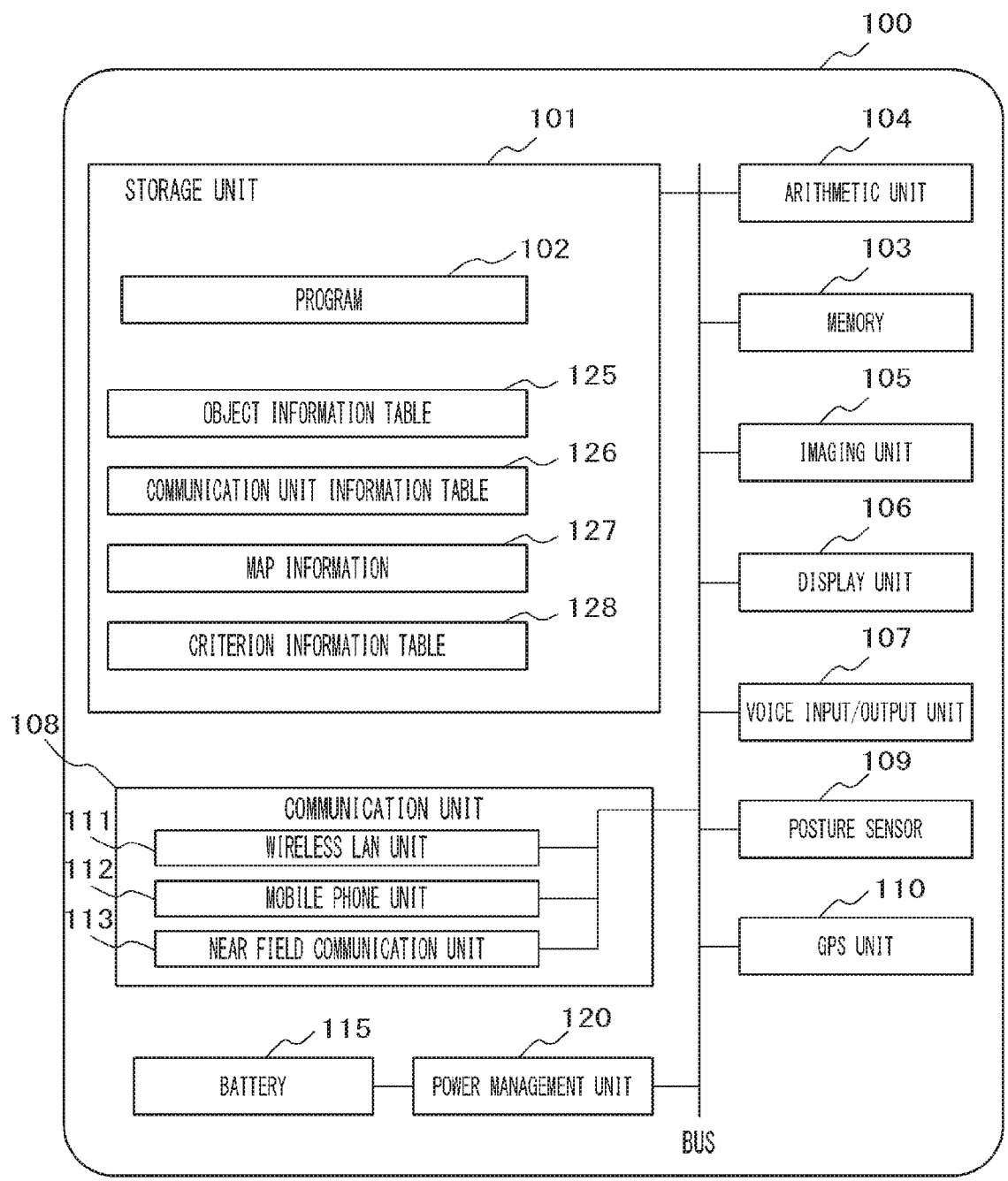
FIG. 2 is a diagram illustrating an example of the hardware configuration of the information display terminal according to the first embodiment.

Next, the hardware configuration of the information display terminal 100 will be described in detail with reference to FIGS. 1 and 2. FIG. 2 is a diagram illustrating an example of the hardware configuration of the information display terminal 100 according to this embodiment. The information display terminal 100 includes at least a storage unit 101, a memory 103, an arithmetic unit 104, an imaging unit 105, a display unit 106, a voice input/output unit 107, a communication unit 108, a posture sensor 109 (posture detection unit), a GPS unit 110 (positioning unit), and a power management unit 120. The posture sensor 109 is not an indispensable component in the information display terminal 100 according to the first embodiment.

Among the units, the storage unit 101 is an appropriate non-volatile storage element, such as a solid state drive (SSD), and stores at least a program 102 for implementing necessary functions of the information display terminal 100 or tables required for various processes. In addition, the memory 103 is a volatile storage element, such as a RAM, and is, for example, a read destination of the program 102 in the storage unit 101.

The arithmetic unit 104 is a CPU that reads the program 102 stored in the storage unit 101 to the memory 103, executes the program 102 to control the overall operation of the terminal, and performs various determination, calculation, and control processes.

The imaging unit 105 is provided in the wearable information display terminal 100 and has allowable size and weight. A digital camera that is small enough to be mounted to, for example, glasses can be assumed as the imaging unit 105. An optical system of the imaging unit 105 is provided so as to capture an image in the viewing direction of the user 1 who wears glasses having the information display terminal 100 mounted thereto. Data of the image captured by the imaging unit 105 is transmitted to an appropriate region of the memory 103 and/or the storage unit 101, is temporarily stored therein, and is used in a candidate object specification process.

The display unit 106 is an element that has the same structure as that provided in the wearable terminal according to the related art and includes, for example, a display which is made of a transparent material, such as glasses, and a display control unit which outputs display data (for example, the image captured by the imaging unit 105 or information related to the candidate object) received from the arithmetic unit 104 onto the display.

Figure 3:
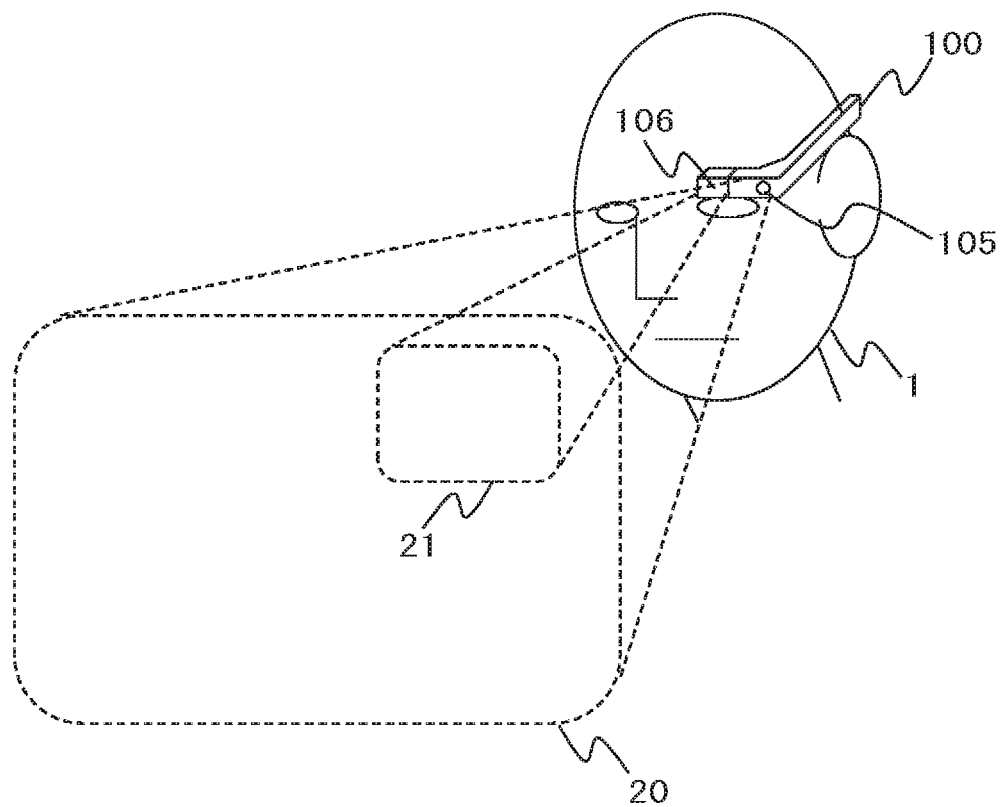
FIG. 3 is a diagram illustrating an example of a situation in which the information display terminal according to the first embodiment is mounted.

FIG. 3 illustrating an example of the display form of information by the display unit 106. As illustrated in FIG. 3, the display unit 106 can project a virtual image plane 21 as a related information display region to an imaging region 20 of the imaging unit 105 which is in front of the user 1.

The virtual image plane 21 is a region in which image data of the related information is displayed as a virtual image or a real image, or a retina write image. The virtual image plane 21 illustrated in FIG. 3 has a size that occupies only a portion of the imaging region 20. However, the invention is not limited thereto. The virtual image plane 21 may have a size that covers a wide area of the imaging region 20.

In this case, the display form of information by a head-mounted display in the wearable terminal and a structure required for the display can be achieved by the existing technique. The type of information display terminal 100 illustrated in FIG. 3 is not particularly limited as long as it integrally includes the display unit 106 that is mounted to the head of the user 1 and can display information in the field of view of the user 1 and the imaging unit 105 that can capture an image in the viewing direction of the user 1. For example, the information display terminal 100 may be a glasses type, a goggle type, a monocular head-mounted type, or a binocular head-mounted type. In addition, for example, a method using a half mirror or a method that directly projects a virtual image to the retina of the user 1 can be used as a method for display information in the display. It is assumed that at least the head-mounted display is a transmissive type and does not cover the field of view of the user 1 when a virtual image is not displayed.

The voice input/output unit 107 of the information display terminal 100 includes a microphone that senses the voice of the user 1 and an earphone that outputs audio data transmitted from the arithmetic unit 104.

The communication unit 108 performs a communication process with, for example, the server 300, the facility terminal 400, or the mobile phone 200, using various communication environments, such as the mobile phone network 11, the wireless LAN 12, and the near field communication 13. In this embodiment, the communication unit 108 includes a wireless LAN unit 111, a mobile phone unit 112, and a near field communication unit 113 as examples of a plurality of types of communication units. For example, a Bluetooth (registered trademark) unit can be used as the near field communication unit 113. In addition to the above-mentioned units, a wireless communication unit that transmits radio waves with various wavelengths, such as UHF and VHF, as carrier waves can be used.

The posture sensor 109 is a sensor that senses the posture of the information display terminal 100 or the user 1 who wears the information display terminal 100. The existing sensor, such as a gyro sensor that detects, for example, the inclination of the information display terminal 100 or the user 1 with respect to a predetermined axis or the direction thereof, can be used as the posture sensor 109.

The GPS unit 110 receives radio waves from a plurality of positioning satellites 15 (see FIG. 1) which revolve around the earth and specifies the coordinates of the current position of the GPS unit 110, that is, the information display terminal 100 or the user 1 who wears the information display terminal 100 on the earth.

The power management unit 120 manages a battery 115 for driving the information display terminal 100 and can monitor the state of the battery 115 to constantly detect the remaining battery level.

The storage unit 101 stores an object information table 125, a communication unit information table 126, map information 127, and a criterion information table 128, in addition to the program 102 for implementing the necessary functions of the information display terminal 100 according to this embodiment. These tables will be described in detail below. The general configuration of the computer is the same as that of the server 300 or the facility terminal 400.

Next, the functions of the information display terminal 100 according to this embodiment will be described. As described above, for example, the functions which will be described below are implemented by executing the program 102 of the information display terminal 100.

The information display terminal 100 has an information acquisition function that recognizes a candidate object in the image captured by the imaging unit 105 according to a predetermined criterion (for example, an image recognition template stored in the criterion information table 128 in advance), selects a predetermined type of communication unit among a plurality of types of units 111 to 113 on the basis of at least one of information (for example, information stored in the object information table 125) which is related to the candidate object and is stored in advance and predetermined detection information which is obtained from a predetermined element (for example, the posture sensor 109, the GPS unit 110, and the units 111 to 113 of the communication unit 108), accesses a predetermined device, such as the server 300, on the network through the selected communication unit, and acquires information related to the candidate object on the basis of identification information (for example, a facility name and a store name obtained by image recognition) recognized from the candidate object.

In addition, the information display terminal 100 has an information display function that displays the information related to the candidate object acquired from the predetermined device on the network in the viewing direction of the user 1, using the display unit 106, when a predetermined object (a second object, for example, a finger of the user 1 who touches the candidate object) is present in the image captured by the imaging unit 105 or when a predetermined positional relationship between the candidate object and the predetermined object is specified.

When a predetermined positional relationship between the candidate object and a predetermined object in the image captured by the imaging unit 105 is maintained for a predetermined period of time (for example, a value stored in the criterion information table 128) or more, the information display function of the information display terminal 100 may display the information related to the candidate object, which has been acquired from the predetermined device on the network, in the viewing direction of the user 1 using the display unit 106.

When any one of the communication units 111 to 113 in the communication unit 108 is selected, the information acquisition function of the information display terminal 100 may select a type of available communication unit indicated by information about a communication environment in the candidate object, which is the information related to the candidate object stored in advance, with reference to the communication unit information table 126 which will be described in detail below.

In addition, when any one of the communication units 111 to 113 in the communication unit 108 is selected, the information acquisition function of the information display terminal 100 may select a communication unit having a radio field intensity that is equal to or greater than a predetermined level among the current radio field intensities sensed by the communication units 111 to 113 as predetermined detection information which is obtained from a predetermined element, for example, when or before the candidate object is recognized.

Furthermore, when any one of the communication units 111 to 113 in the communication unit 108 is selected, the information acquisition function of the information display terminal 100 may select a communication unit with minimum power consumption, with reference to information about the power consumption level of each communication unit in the communication unit information table 126 when the remaining batter level obtained from the power management unit 120 of the information display terminal 100 is equal to or less than a predetermined value as predetermined detection information which is obtained from a predetermined element, for example, when or before the candidate object is recognized.

When any one of the communication units 111 to 113 in the communication unit 108 is selected, the information acquisition function of the information display terminal 100 may calculate the distance between the current position of the information display terminal 100 obtained from the GPS unit 110 and the position of the candidate object on the map which is specified by collating the identification information (for example, a facility name) of the object recognized from the candidate object with the map information 127 as predetermined detection information which is obtained from a predetermined element, for example, when or before the candidate object is recognized, collate the calculated distance with the value of the communication distance of each communication unit in the communication unit information table 126, and select a communication unit having a communicable distance including the calculated distance.

When any one of the communication units 111 to 113 in the communication unit 108 is selected, the information acquisition function of the information display terminal 100 may select a communication unit in the order of priority of each communication unit in the communication unit information table 126 on the basis of at least one of the information related to the candidate object which is stored in advance and predetermined detection information which is obtained from a predetermined element, for example, when or before the candidate object is recognized.

Next, the detailed structure of the tables stored in the storage unit 101 of the information display terminal 100 will be described. FIG. 4 is a diagram illustrating an example of the object information table 125 in the first embodiment. The object information table 125 stores information about each object, such as stores, facilities, and articles, which is acquired by the information display terminal 100. The data structure of the object information table 125 is an aggregate of records in which data, such as the type, name, and communication environment of an object and an image recognition template of the object are associated with an object ID as a key. The image recognition template of the object is a template for specifying the candidate object from the image captured by the imaging unit 105 of the information display terminal 100 and is data in which feature amounts related to combinations of the shapes and colors of the objects are integrated.

FIG. 5 is a diagram illustrating an example of the communication unit information table 126 in the first embodiment. The communication unit information table 126 stores each information item about the specifications or the usage priority of the communication units 111 to 113 forming the communication unit 108. The data structure of the communication unit information table 126 is an aggregate of records in which data, such as the communication type, communicable distance, power consumption, and usage priority of the communication unit, is associated with a unit ID as a key.

Figure 6:
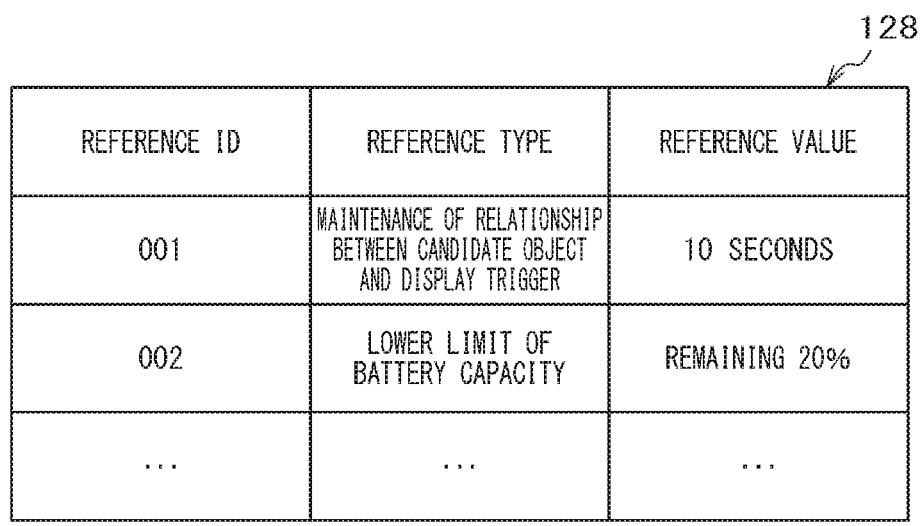
FIG. 6 is a diagram illustrating an example of a criterion information table in the first embodiment.

FIG. 6 is a diagram illustrating an example of the criterion information table 128 in the first embodiment. The criterion information table 128 stores information about criteria associated with the process of the information display terminal 100. The data structure of the criterion information table 128 is an aggregate of records in which each data, such as a reference type and a reference value, is associated with a reference ID as a key. The information display terminal 100 stores identification information related to a process involving determination in advance and the identification information is associated with the reference ID of the criterion information table 128. Therefore, the information display terminal 100 reads the reference value, which is referred to when determination is performed, from a record of the reference ID associated with the determination and uses the read reference value.

FIG. 2 illustrates an example in which the storage unit 101 of the information display terminal 100 also stores the map information 127. However, since the map information 127 is data of a general-purpose electronic map that has currently been used, the detailed description thereof will not be repeated.

Next, the actual procedure of an information display method in the first embodiment will be described with reference to the drawings. Various operations corresponding to the following information display method are implemented by the program 102 which is read from the memory 103 and then executed by the information display terminal 100. The program 102 includes cords for performing various operations which will be described below.

Figure 7:
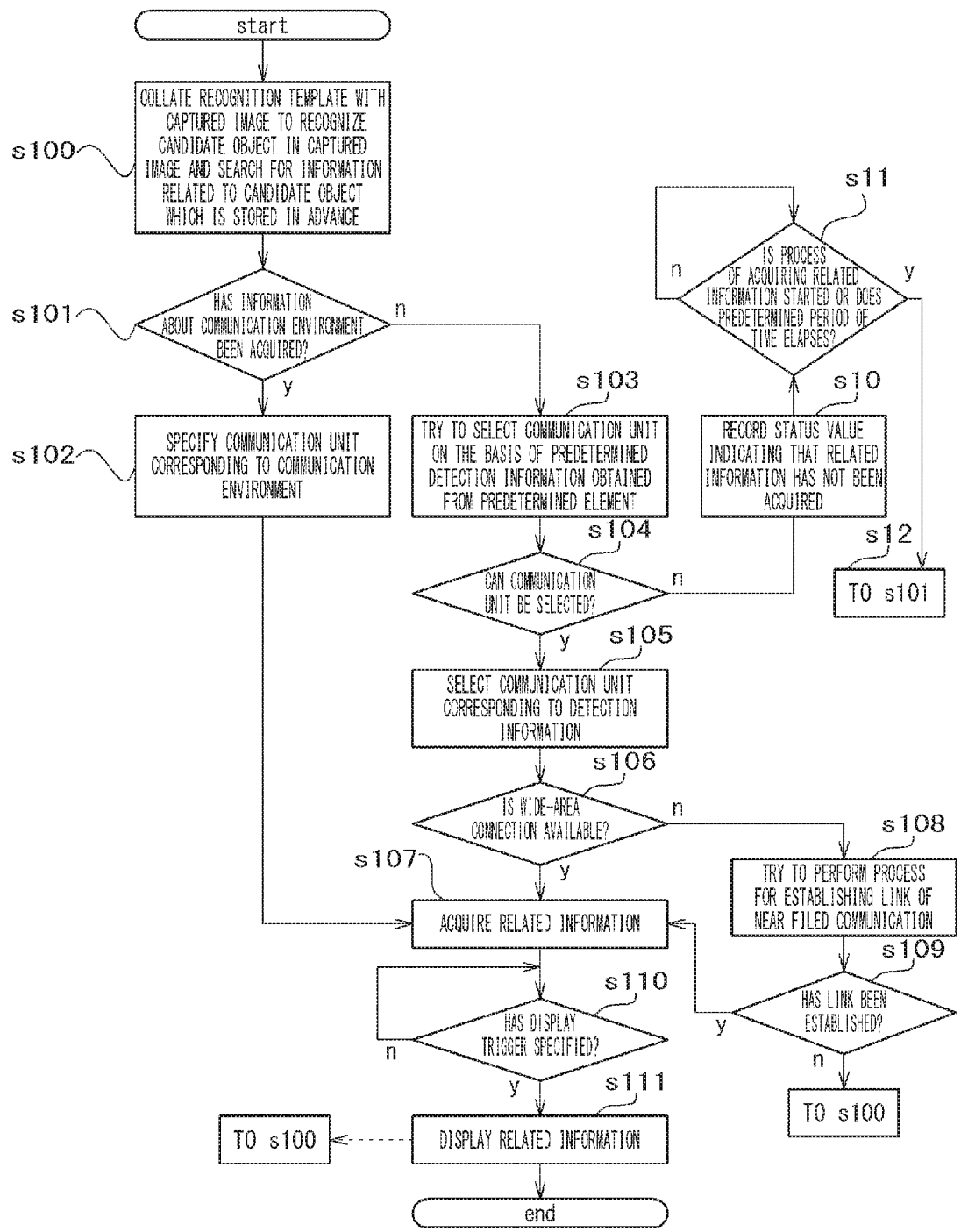
FIG. 7 is a flowchart illustrating an example of the procedure of an information display method in the first embodiment.

FIG. 7 is a flowchart illustrating example 1 of the procedure of the information display method in the first embodiment. Here, as the usage situation of the information display terminal 100, a situation is assumed in which the user wearing the information display terminal 100 walks around a shopping mall or a shopping district and looks at each store. This flow is always performed while the information display terminal 100 is operating. However, it may also be assumed that this flow is performed by only a predetermined start trigger. For example, as a flow start trigger, the information display terminal 100 may use various instructions from the user, such as an input event of a predetermined voice sensed by the voice input/output unit 107 and a touch operation sensed by a pressure sensor (not illustrated). Alternatively, an event in which it is confirmed that the user 1 approaches or is located in a specific store on the basis of positional information detected by the GPS unit 110 or the image captured by the imaging unit 105 may be used.

The information display terminal 100 is moved in the shopping mall integrally with the user 1, collates each recognition template of, for example, a store or an article, which is stored in the object information table 125 (or the criterion information table 128) in advance with an image, such as an internal scene of the mall captured by the imaging unit 105, recognizes a candidate object in the captured image, and searches for information about the candidate object, which is stored in advance, from the object information table 125 (s100).

When recognizing the candidate object, specifically, the information display terminal 100 performs an image recognition process for the captured image, using a predetermined image processing function of the program 102, and performs a pattern matching process between each object cut out by the image recognition process and the recognition template to recognize the candidate object.

For example, when information about a communication environment "store wireless LAN" is acquired from a candidate object which is a store "○○ Wear" by the search process in Step s100 (s101: y), the information display terminal 100 specifies a communication unit corresponding to the communication environment, that is, the wireless LAN unit 111 in the communication unit information table 126 (s102).

In some cases, any candidate object can be specified in the captured image, but information about a communication environment corresponding to the template has not been registered in, for example, the object information table 125. The reason is as follows. When the template is not associated with only an individual specific object and is a template for specifying, for example, a general "fast food store", it is difficult to set information about the communication environment in the object information table 125 when a communication environment common to all of the fast food stores is not established.

In this case, the information display terminal 100 is not capable of acquiring information about the communication environment for the candidate object using the search process in Step s100 (s101: n). At that time, the information display terminal 100 selects a communication unit on the basis of predetermined detection information obtained from at least one of the elements provided in the information display terminal 100 (s103). In this case, the information display terminal 100 acquires detection information from a predetermined specific element or an element which is determined on the basis of whether the detection information can be acquired or the order in which the detection information is acquired, collates the detection information with the communication unit information table 126, and specifies a corresponding communication unit. Hereinafter, each pattern of the communication unit selection process in this case will be described. The information display terminal 100 may sequentially perform the processes in the following patterns 1 to 3 until a communication unit can be selected or may perform only a predetermined pattern.

In pattern 1, the information display terminal 100 selects a communication unit on the basis of the current radio field intensities sensed by the communication units 111 to 113. In this case, the information display terminal 100 calls the values of the radio field intensities sensed by the communication units 111 to 113 in Step s103 and selects a communication unit with a radio field intensity that is equal to or greater than a predetermined level (s104: y, s105). For example, when only the value of the radio field intensity sensed by the mobile phone unit 112 among the values of the radio field intensities sensed by the wireless LAN unit 111, the mobile phone unit 112, and the near field communication unit 113, is a value useful for communication (recognized by the information display terminal 100), the information display terminal 100 selects the mobile phone unit 112.

When none of the communication units 111 to 113 have a radio field intensity at a communicable level (s104: n), the information display terminal 100 recognizes that communication is unavailable in the current communication environment, stops acquiring the related information, and returns the process to Step s100. For the candidate object of which the related information is not acquired by the current process, the information display terminal 100 records a status value indicating that the related information has not been acquired in the memory 103 and/or the storage unit 101 (s10) and starts a process of acquiring the related information of another candidate object or waits until any event is detected after a predetermined period of time elapses (s11: n). When any event is detected (s11: y), it is preferable to perform a series of processes for acquiring the related information again (s12).

In pattern 2, the information display terminal 100 selects a communication unit on the basis of the remaining battery level acquired from the power management unit 120. In this case, the information display terminal 100 calls the remaining level of the battery 115, using the power management unit 120, in Step s103. When the remaining battery level is equal to or less than a predetermined level, the information display terminal 100 selects a communication unit with minimum power consumption with reference to information about the power consumption levels of the communication units 111 to 113 in the communication unit information table 126 (s104: y, s105). In the example of the communication unit information table 126 illustrated in FIG. 5, the near field communication unit 113 with a unit ID "T003" is selected as the communication unit with minimum power consumption.

In pattern 3, a communication unit is selected on the basis of the distance between the information display terminal 100 and the candidate object. In this case, the information display terminal 100 calculates the distance between current position (coordinate value) of the information display terminal 100 obtained from the GPS unit 110 and the position (coordinate value) of the candidate object on the map, which is specified by collating object identification information (for example, a facility name) recognized from the candidate object with the map information 127, in Step s103. Then, the information display terminal 100 collates the calculated distance with the value of the communicable distance of each communication unit in the communication unit information table 126 and selects a communication unit with a communicable distance including the calculated distance (s104: y, s105).

For example, when the coordinates of the current position of the information display terminal 100 obtained from the GPS unit 110 are (a, b) and the coordinates of the position of the candidate object on the map, which is specified by collating object identification information (for example, a facility name) recognized from the candidate object with the map information 127, are (c, d), a distance x between the positions can be calculated as follows: $x=((a-c)^2+(b-d)^2)^{1/2}$. When the distance x is, for example, "5 m", the wireless LAN unit 111 with a unit ID "T001" and the mobile phone unit 112 with a unit ID "T002", which have a communicable distance of "5 m" or more, are selected with reference to the communication unit information table 126 illustrated in FIG. 5. As such, when a plurality of communication units are selected, the information display terminal 100 may select, for example, a communication unit with high priority or minimum power consumption. When none of the communication units 111 to 113 have a communicable distance that is greater than the calculated distance x (s104: n), the information display terminal 100 recognizes that communication is unavailable in the current communication environment, stops acquiring the related information, and returns the process to Step s100. As described above, preferably, the information display terminal 100 performs a series of processes for acquiring the related information of the candidate object, which has not been acquired by the current process, at an appropriate time again (s10 to s12).

The information display terminal 100 which has selected a communication unit in Steps s103 to s105 determines whether the selected communication unit is based on a protocol that can directly access the Internet 10 (s106). When the communication unit is the mobile phone unit 112 or the wireless LAN unit 111, the information display terminal 100 determines that the communication unit can directly access the Internet 10 (s106: y). On the other hand, when the communication unit is the near field communication unit 113, the information display terminal 100 determines that the communication unit is not capable of directly accessing the Internet 10 (s106: n).

When it is determined in Step s106 that the communication unit is based on the protocol that can directly access the Internet 10 (s106: y), the information display terminal 100 accesses the server 300 or the facility terminal 400 on the Internet 10, using the communication unit, searches for the related information of the candidate object, using identification information (for example, a facility name or an article name obtained by image recognition) recognized from the candidate object as a key, and acquires various kinds of related information such as coupons, special sale information, and complementary tickets (s107).

When it is determined in Step s106 that the communication unit is based on a protocol that is not capable of directly accessing the Internet 10 (s106: n), the information display terminal 100 tries to perform a process of establishing a link to the mobile phone 200 of the user 1, using the near field communication 13 of the near field communication unit 113 (s108). Of course, when the user 1 does not have the mobile phone 200 with a near field communication function, it is difficult to establish a link using the near field communication 13. Therefore, the information display terminal ends the process and returns to s100.

As the result of the trial process, when the establishment of the link between the mobile phone 200 and the near field communication 13 has succeeded (s109: y), the information display terminal 100 performs a so-called tethering process using the mobile phone 200 as a router, accesses the server 300 and/or the facility terminal 400 on the Internet 10, searches for the related information of the candidate object using the same method as described above, and acquires the related information (s107). In the process of establishing the link of the near field communication 13, first, it is checked or authenticated whether the mobile phone 200 to which a link is to be established is a specific mobile phone 200 that has formed a pair (has been associated) with the information display terminal 100 in advance.

As the result of the trial process, when the establishment of the link between the mobile phone 200 and the near field communication 13 has failed (s109: n), the information display terminal 100 recognizes that it is difficult to establish communication for acquiring the related information, stops acquiring the related information, and returns the process to Step s100. As described above, the information display terminal 100 performs a series of processes for acquiring the related information of the candidate object, which has not been acquired by the current process, at an appropriate time again (s10 to s12).

The information display terminal 100 repeatedly performs each of the above-mentioned steps until a predetermined object (hereinafter, referred to as a "display trigger") is specified in the captured image (s109: n and s100). In this embodiment, even if the candidate object is detected in Step s100 and the related information of the candidate object is acquired in Step s101, a virtual image of the related information is not displayed on the display unit 106 as long as the display trigger is captured by the imaging unit 105 and is not recognized in the captured image including the candidate object. In this embodiment, it is assumed that the display trigger is a part of the user 1. In the following description, a "finger" is assumed as a part of the user 1 which is the display trigger.

Figure 8:
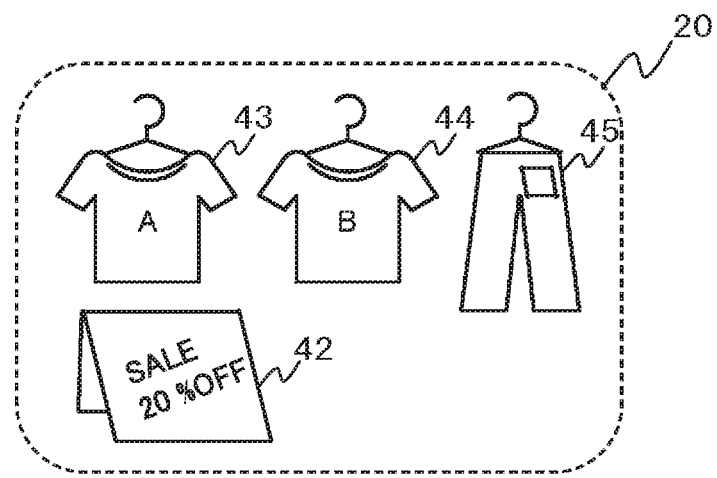
FIG. 8 is a diagram illustrating example 1 of the display form of a display unit in the first embodiment.

For example, as illustrated in FIG. 8, it is assumed that candidate objects 42 to 45, such as clothes and a signboard, are detected in a captured image corresponding to an imaging region 20 in a certain clothing store. In this case, it is assumed that the information display terminal 100 the above-mentioned related information acquisition process to acquire information related to each of the candidate objects 42 to 45. Then, the information display terminal 100 performs an image recognition process to determine whether an image of the finger of the user 1, which is the display trigger, is included in the captured image including the candidate objects 42 to 45 (s110). For the image recognition process associated with the determination, the information display terminal 100 stores a template indicating, for example, a feature amount related to the image of the finger of the user 1 in, for example, the criterion information table 128 in advance and can appropriately use the template.

However, as illustrated in FIG. 8, the image of the finger of the user 1, which is the display trigger, is not present in the captured image of the imaging region 20. Therefore, the information display terminal 100 determines that the image of the finger of the user 1, which is the display trigger, is not included in the captured image including the candidate objects 42 to 45 (s110: n), does not display any information related to the candidate objects 42 to 45, and returns the process to Step s100.

Figure 9:
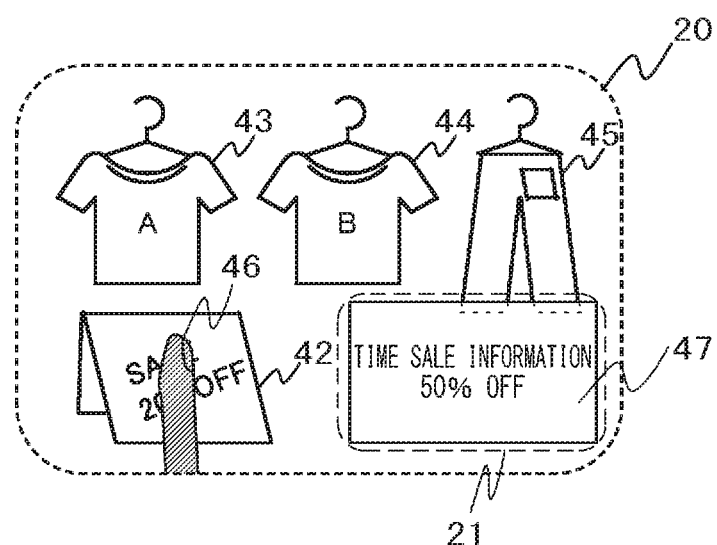
FIG. 9 is a diagram illustrating example 2 of the display form of the display unit in the first embodiment.

It is assumed that the user 1 is interested in any one of the candidate objects 42 to 45 and moves a finger to the actual candidate object. In this case, an image in which the finger approaches or overlaps the candidate object is included in the image of the imaging region 20 captured by the imaging unit 105. FIG. 9 illustrates a situation in which the image of the finger of the user 1, which is a display trigger 46, overlaps the image of the candidate object 42.

In this situation, the information display terminal 100 determines or specifies that the display trigger 46 overlaps at least a portion of the candidate object 42 in the captured image of the imaging region 20 or the distance between the display trigger 46 and the candidate object 42 is in a predetermined range (s110: y) and displays the related information of the candidate object 42, which has been acquired by the above-mentioned steps, as a virtual image 47 in the viewing direction of the user 1, using the display unit 106 (s111). Then, the information display terminal 100 returns to Step s100 or ends the process in response to an instruction from the user 1. In addition, in Step s110, the information display terminal 100 may measure the time for which a predetermined positional relationship between the candidate object and the display trigger 46 is maintained in the image captured by the imaging unit 105. When the measured time is greater than a predetermined value (for example, a value stored in the criterion information table 128), the information display terminal 100 may display the related information of the candidate object, using the display unit 106.

As described above, the information display terminal 100 constantly acquires the related information and can appropriately display the related information when the user performs a natural operation that can be performed by the human beings, such as an operation of stretching a hand to an object in which the user is interested or of which the information is desired by the user. Therefore, it is possible to avoid a situation in which unnecessary information about the object in which the user wearing the information display terminal 100 is not interested is frequently displayed to the user, to avoid a complicated operation associated with the display of information as much as possible, and to browse information at the time or frequency matched with the user's intention. As a result, it is possible to improve the comfort or convenience of the user.

Embodiment 2

Figure 10:
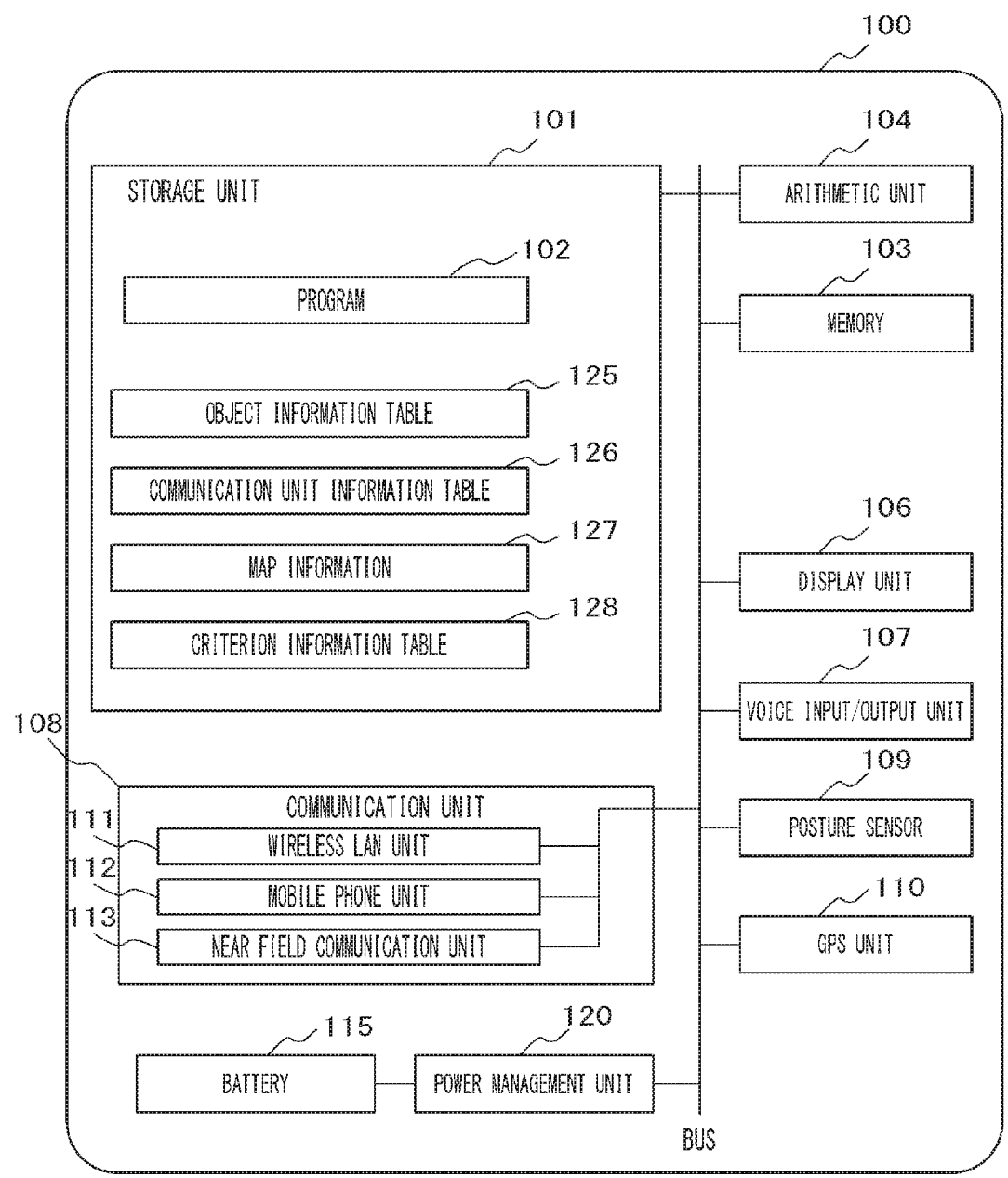
FIG. 10 is a diagram illustrating an example of the hardware configuration of an information display terminal according to a second embodiment.

Next, a second embodiment will be described. FIG. 10 is a diagram illustrating an example of the hardware configuration of an information display terminal according to the second embodiment. An information display terminal 100 according to the second embodiment has a structure in which the imaging unit 105 is not an indispensable component (of course, the imaging unit 105 may be provided) and the posture sensor 109, the GPS unit 110, and the map information 127 are indispensable components. In the second embodiment, for example, the description of the same structures and functions as those in the information display terminal 100 according to the first embodiment will not be repeated.

The information display terminal 100 according to the second embodiment has a function of specifying a position on a map which is indicated by the coordinates of the current position of the information display terminal 100 obtained from the GPS unit 110 and the viewing direction of the user 1 at the position on the map, from the coordinates of the current position of the information display terminal 100, the direction of the information display terminal 100 obtained from the posture sensor 109, that is, the viewing direction of the user 1, and map information 127 stored in the storage unit 101.

In addition, the information display terminal 100 has a function of specifying an object that is present in the viewing direction at the position of the user 1 on the map, using the map information 127, and recognizing the object as a candidate object in which the user 1 is interested.

Furthermore, the information display terminal 100 has a function of selecting a specific communication unit from a plurality of types of communication units 111 to 113 on the basis of at least one of information related to the candidate object which is stored in advance and predetermined detection information obtained from a predetermined element, accessing the server 300 or the facility terminal 400 on the Internet 10 through the communication unit, and acquiring the related information of the candidate object on the basis of identification information recognized from the candidate object.

The information display terminal 100 further has a function of measuring the time for which the user 1 looks at the candidate object and displaying the acquired related information of the candidate object as a virtual image in the viewing direction of the user 1, using the display unit 106, when the measured time is equal to or greater than a predetermined value.

Figure 11:
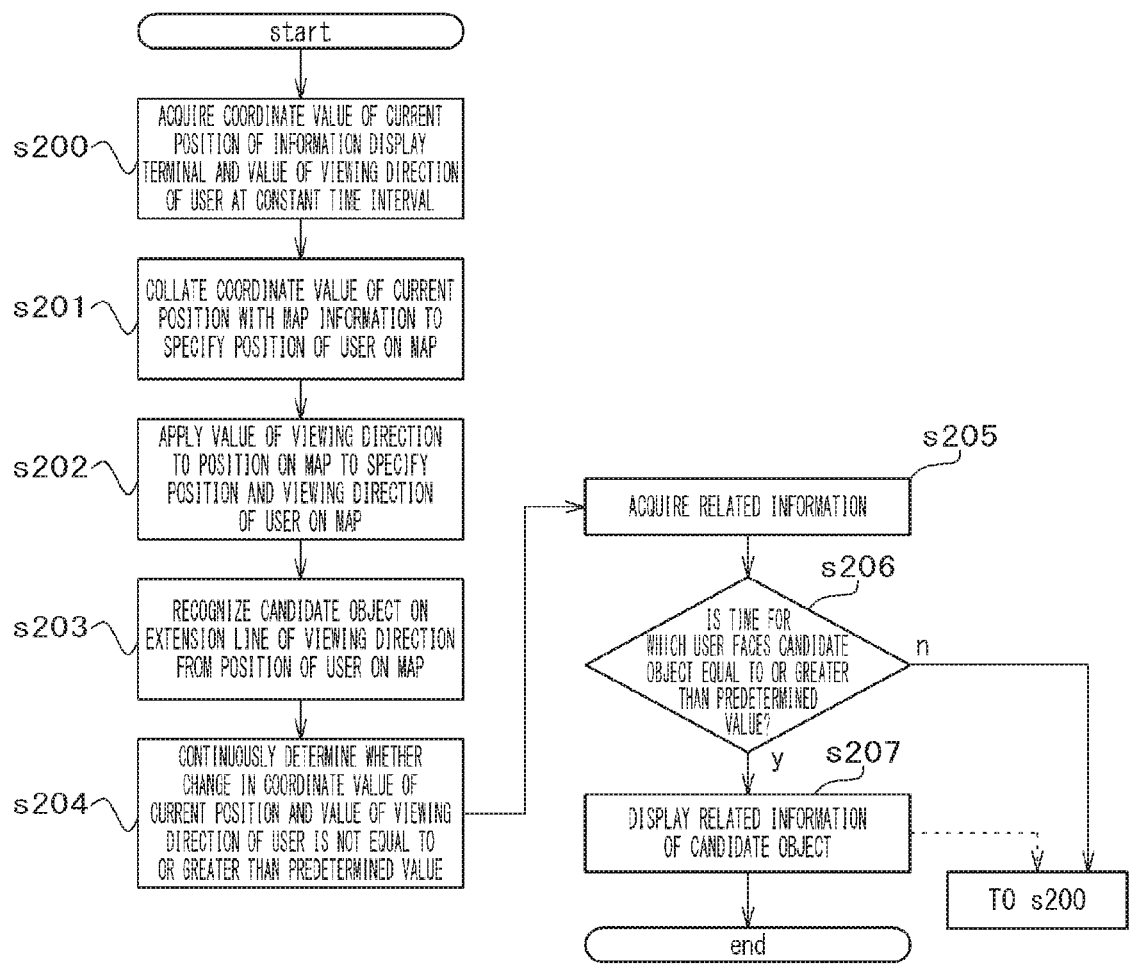
FIG. 11 is a flowchart illustrating an example of the procedure of an information display method in the second embodiment.

Next, the process of the information display terminal 100 according to the second embodiment will be described. FIG. 11 is a flowchart illustrating the procedure of an information display method in the second embodiment. Here, the difference from the flow in the first embodiment will be mainly described.

Here, it is assumed that the user 1 who wears the information display terminal 100 gazes at stores according to interest while walking along the street. In this case, the information display terminal 100 acquires the coordinate value of the current position of the information display terminal 100 from the GPS unit 110 at a constant time interval and acquires the direction of the information display terminal 100, that is, the value of the viewing direction of the user 1 from the posture sensor 109 (s200).

Then, the information display terminal 100 collates the coordinate value of the current position obtained in Step s200 with the map information 127 of the storage unit 101 to specify the position of the user 1 on the map (s201). In addition, the information display terminal 100 applies the value (for example, an angle in all directions) of the viewing direction of the user 1 obtained in Step s200 to the position of the user 1 on the map to specify the position and viewing direction of the user 1 on the map (s202).

In this case, for example, the information display terminal 100 specifies an address, which corresponds to the coordinate value (e, f) of the current position obtained from the GPS unit 110 on the map, as the position of the user 1, with reference to the correspondence relationship between address information and a GPS coordinate value indicated by the map information 127. In addition, the information display terminal 100 applies the value (for example, 45 degrees when true north is 0 degrees, true east is 90 degrees, true south is 180 degrees, and true west is 270 degrees) of the viewing direction of the user 1 obtained from the posture sensor 109 to the specified address of the user 1 to specify that the user 1 faces the northeast from the address of the user 1 on the map.

Then, the information display terminal 100 specifies the closest object among the objects on an extension line of the viewing direction (for example, the northeast direction) from the specified address (for example, ○-banchi, ○-chome, ○○-urachi, ○○-shi) of the user 1 on the map, using the map information 127, and recognizes the specified object as the candidate object in which the user 1 is interested (s203).

In this case, for example, the information display terminal 100 specifies, as the candidate object, a first facility on a segment, which is drawn in the northeast direction from the position of the user 1 on the map, on the map. In addition, after Step s203, the information display terminal 100 monitors the coordinate value of the current position obtained from the GPS unit 110 and the value of the viewing direction of the user 1 obtained from the posture sensor 109 and determines whether a change in the values is not equal to or greater than a predetermined value (s204).

The information display terminal 100 selects a specific communication unit from a plurality of types of communication units 111 to 113 on the basis of at least one of the information related to the candidate object which is stored in advance and predetermined detection information obtained from a predetermined element, accesses, for example, the server 300 or the facility terminal 400 on the Internet 10 through the communication unit, and acquires the related information of the candidate object on the basis of identification information recognized from the candidate object (s205). The communication unit selection operation associated with the acquisition of the related information and the subsequent related information acquisition process are the same as those in the first embodiment.

After acquiring the related information, the information display terminal 100 checks the determination result in Step s204 and determines whether a situation in which a change in the coordinate value of the current position and the value of the viewing direction is not equal to or greater than a predetermined value is maintained for a predetermined period of time (s206). When it is determined that the time for which the user 1 faces the candidate object is greater than a predetermined value (for example, a few seconds) (s206: y), the information display terminal 100 displays the acquired related information of the candidate object as a virtual image in the viewing direction of the user 1, using the display unit 106 (s207). Then, the information display terminal 100 returns the process to Step s200 or ends the process in response to a predetermined instruction from the user 1.

On the other hand, when it is determined that the time for which the user 1 faces the candidate object is not greater than the predetermined value (s206: n), the information display terminal 100 recognizes that the user is not very interested in the candidate object, avoids a process of displaying the information related to the candidate object, and returns the process to Step s200.

As such, even in the structure in which the information display terminal 100 does not include the imaging unit 105, the information display terminal 100 constantly acquires the related information and can appropriately display the related information when the user performs a natural operation that can be performed by the human beings, such as an operation of gazing at an object in which the user is interested or of which the information is desired by the user for a predetermined period of time. Therefore, it is possible to prevent a situation in which unnecessary information about the object in which the user wearing the information display terminal 100 is not interested is frequently displayed to the user, to avoid a complicated operation associated with the display of information as much as possible, and to browse information at the time or frequency matched with the user's intention. As a result, it is possible to improve the comfort or convenience of the user.

For example, preferred embodiments of the invention have been described in detail above. However, the invention is not limited thereto and various modifications and changes of the invention can be made without departing from the scope and spirit of the invention.

According to this embodiment, the wearable information display terminal matches the time or frequency of information display with the user's intention, can reduce a terminal operating time or a communication fee, and can improve the comfort or convenience of the user when the terminal is used.

At least the following can be apparent by this specification. That is, in the information display method according to the first embodiment, in the information display process, when the predetermined positional relationship between the first object and the second object in the image captured by the imaging unit is maintained for a predetermined period of time or more, the information display terminal may display the acquired related information of the first object in the viewing direction, using the display unit.

According to this structure, it is possible to display necessary information which is accurately matched with the user's intention on the basis of a situation in which the wearer of the wearable information display terminal gazes at the first object with strong interest or performs any operation to approach the first object.

In the information display method according to the first embodiment, when the communication unit is selected in the information acquisition process, the information display terminal may select the predetermined type of communication unit among the plurality of types of communication units on the basis of an available communication type indicated by information about a communication environment of the first object as the information related to the first object which is stored in advance.

According to this structure, the information display terminal can reliably and easily recognize the presence of a public wireless LAN which can be used in the vicinity of the first object or communication resources (for example, a wireless LAN) provided by the first object and can smoothly perform a series of processes from the acquisition of the related information to the display of the related information at a low cost.

In the information display method according to the first embodiment, when the communication unit is selected in the information acquisition process, the information display terminal may select a communication unit that has a radio field intensity equal to or greater than a predetermined level among the current radio field intensities sensed by each communication unit as the predetermined detection information obtained from the predetermined element.

According to this structure, the communication unit can perform communication with high efficiency in a situation in which radio field intensity is high. Therefore, it is possible to prevent an unnecessary waste of the communication time and battery capacity and to improve the comfort or convenience of the user (wearer) when the terminal is used.

In the information display method according to the first embodiment, when the communication unit is selected in the information acquisition process, the information display terminal may select a communication unit with minimum power consumption when a remaining battery level obtained from a power management unit of the information display terminal is equal to or less than a predetermined value as the predetermined detection information obtained from the predetermined element.

According to this structure, it is possible to minimize the power consumption of the communication unit. For example, even in a situation in which the information display terminal is used in a place where it is difficult to charge or feed the information display terminal, it is possible to continuously perform a series of processes including the specification of the first object, the acquisition of the related information, and the display of the related information. Therefore, it is possible to improve the comfort or convenience of the user (wearer) when the terminal is used.

In the information display method according to the first embodiment, the information display terminal may further include a positioning unit that measures a current position of the information display terminal and a storage unit that stores map information. When the communication unit is selected in the information acquisition process, the information display terminal may calculate a distance between the current position of the information display terminal obtained from the positioning unit and a position of the first object on a map, which is specified by collating the identification information recognized from the first object with the map information, as the predetermined detection information obtained from the predetermined element and select a communication unit with a communicable distance including the calculated distance.

According to this structure, when a communication partner is an object or is present in the object, it is possible to accurately select a communication unit corresponding to the distance to the object, to perform the most effective communication without any difference between the communication performance and the actual communication environment, and to prevent an unnecessary waste of the communication time or battery capacity. Therefore, it is possible to improve the comfort or convenience of the user (wearer) when the terminal is used.

In the information display method according to the first embodiment, when the communication unit is selected in the information acquisition process, the information display terminal may select the communication unit in an order of priority of each type of communication unit, on the basis of at least one of the information related to the first object which is stored in advance and the predetermined detection information obtained from the predetermined element.

According to this structure, for example, in a case in which the information display terminal includes two types of communication units, that is, a default communication unit with a high priority and an auxiliary communication unit with a low priority, control can be performed such that the default communication unit is selected when information about a customer object or detection information satisfies predetermined criteria and the auxiliary communication unit is selected only in the other cases. Therefore, an operation can be performed such that the default communication unit is commonly used when an inexpensive communication method that can be generally used is used and other communication units are used only in the other special situations. As a result, it is possible to reduce a communication fee or battery power consumption associated with the operation of the communication unit and to improve the comfort or convenience of the user (wearer) when the terminal is used.

In the information display method according to the second embodiment, when the communication unit is selected in the information acquisition process, the information display terminal may select the predetermined type of communication unit among the plurality of types of communication units on the basis of an available communication type indicated by information about a communication environment of the first object as the information related to the first object which is stored in advance.

According to this structure, the information display terminal can reliably and easily recognize the presence of a public wireless LAN which can be used in the vicinity of the first object or communication resources (for example, a wireless LAN) provided by the first object and can smoothly perform a series of processes from the acquisition of the related information to the display of the related information at a low cost.

In the information display method according to the second embodiment, when the communication unit is selected in the information acquisition process, the information display terminal may select a communication unit that has a radio field intensity equal to or greater than a predetermined level among the current radio field intensities sensed by each communication unit as the predetermined detection information obtained from the predetermined element.

According to this structure, the communication unit can perform communication with high efficiency in a situation in which radio field intensity is high. Therefore, it is possible to prevent an unnecessary waste of the communication time and battery capacity and to improve the comfort or convenience of the user (wearer) when the terminal is used.

In the information display method according to the second embodiment, when the communication unit is selected in the information acquisition process, the information display terminal may select a communication unit with minimum power consumption when a remaining battery level obtained from a power management unit of the information display terminal is equal to or less than a predetermined value as the predetermined detection information obtained from the predetermined element.

According to this structure, it is possible to minimize the power consumption of the communication unit. For example, even in a situation in which the information display terminal is used in a place where it is difficult to charge or feed the information display terminal, it is possible to continuously perform a series of processes including the specification of the first object, the acquisition of the related information, and the display of the related information. Therefore, it is possible to improve the comfort or convenience of the user (wearer) when the terminal is used.

In the information display method according to the second embodiment, when the communication unit is selected in the information acquisition process, the information display terminal may calculate a distance between the current position of the information display terminal obtained from the positioning unit and a position of the first object on a map as the predetermined detection information obtained from the predetermined element and selects a communication unit with a communicable distance including the calculated distance.

According to this structure, when a communication partner is an object or is present in the object, it is possible to accurately select a communication unit corresponding to the distance to the object, to perform the most effective communication without any difference between the communication performance and the actual communication environment, and to prevent an unnecessary waste of the communication time or battery capacity. Therefore, it is possible to improve the comfort or convenience of the user (wearer) when the terminal is used.

In the information display method according to the second embodiment, when the communication unit is selected in the information acquisition process, the information display terminal may select the communication unit in an order of priority of each type of communication unit, on the basis of at least one of the information related to the first object which is stored in advance and the predetermined detection information obtained from the predetermined element.

According to this structure, for example, in a case in which the information display terminal includes two types of communication units, that is, a default communication unit with a high priority and an auxiliary communication unit with a low priority, control can be performed such that the default communication unit is selected when information about a customer object or detection information satisfies predetermined criteria and the auxiliary communication unit is selected only in the other cases. Therefore, an operation can be performed such that the default communication unit is commonly used when an inexpensive communication method that can be generally used is used and other communication units are used only in the other special situations. As a result, it is possible to reduce a communication fee or battery power consumption associated with the operation of the communication unit and to improve the comfort or convenience of the user (wearer) when the terminal is used.

REFERENCE SIGNS LIST

1 USER (WEARER OF INFORMATION DISPLAY TERMINAL)
5 FACILITY (OBJECT)
10 INTERNET
11 MOBILE PHONE NETWORK
12 WIRELESS LAN
13 NEAR FIELD COMMUNICATION
15 POSITIONING SATELLITE
20 IMAGING REGION
21 VIRTUAL IMAGE PLANE
42 TO 45 CANDIDATE OBJECT (FIRST OBJECT)
46 DISPLAY TRIGGER (SECOND OBJECT)
47 VIRTUAL IMAGE OF RELATED INFORMATION
100 INFORMATION DISPLAY TERMINAL
101 STORAGE UNIT
102 PROGRAM
103 MEMORY
104 ARITHMETIC UNIT
105 IMAGING UNIT
106 DISPLAY UNIT
107 VOICE INPUT/OUTPUT UNIT
108 COMMUNICATION UNIT
109 POSTURE SENSOR (POSTURE DETECTION UNIT)
110 GPS UNIT (POSITIONING UNIT)
111 WIRELESS LAN UNIT
112 MOBILE PHONE UNIT
113 NEAR FIELD COMMUNICATION UNIT
115 BATTERY
120 POWER MANAGEMENT UNIT
125 OBJECT INFORMATION TABLE
126 COMMUNICATION UNIT INFORMATION TABLE
127 MAP INFORMATION
128 CRITERION INFORMATION TABLE
200 MOBILE PHONE
300 SERVER
310 STORAGE
400 FACILITY TERMINAL
500 PERSONAL COMPUTER

The invention claimed is:

1. An information display method that is performed in an information display terminal including a processor coupled to a memory, a camera that captures an image in a viewing direction of a wearer, a display that displays information in the viewing direction, and a plurality of types of communication units that communicate with a network or another terminal which accesses the network, the method comprising:

an information acquisition process, executed by the processor, that recognizes a first object in the image captured by the camera according to a predetermined criterion, selects a communication unit among the plurality of types of communication units on the basis of at least one of information related to the first object which is stored in advance and predetermined detection information which is obtained from a predetermined element, accesses the network or another terminal through the communication unit, and acquires the related information of the first object from the network on the basis of identification information recognized from the first object; and an information display process, executed by the processor, that, when a predetermined positional relationship between the first object and a second object is determined or specified in the image captured by the camera, displays the acquired related information of the first object in the viewing direction using the display, wherein, in the information acquisition process, the communication unit of a predetermined type is selected from among the plurality of types of communication units on the basis of an available communication type indicated by information about a communication environment of the first object as the information related to the first object which is stored in advance.

2. The information display method according to claim 1, wherein, in the information display process, when the predetermined positional relationship between the first object and the second object in the image captured by the camera is maintained for a predetermined period of time or more, the information display terminal displays the acquired related information of the first object in the viewing direction using the display.

3. The information display method according to claim 2, wherein the predetermined positional relationship is that a distance between the first object and the second object is within a predetermined distance or the first object and the second object are overlapped.

4. The information display method according to claim 1, wherein, in the information acquisition process, the information display terminal selects the communication unit that has a radio field intensity equal to or greater than a predetermined level among the current radio field intensities sensed by each communication unit as the predetermined detection information obtained from the predetermined element.

5. The information display method according to claim 1, wherein, in the information acquisition process, the information display terminal selects the communication unit with minimum power consumption when a remaining battery level obtained from a power management unit of the information display terminal is equal to or less than a predetermined value as the predetermined detection information obtained from the predetermined element.

6. The information display method according to claim 1, wherein the information display terminal further includes a positioning unit that measures a current position of the information display terminal and a storage unit that stores map information, and wherein, in the information acquisition process, the information display terminal calculates a distance between the current position of the information display terminal obtained from the positioning unit and a position of the first object on a map, which is specified by collating the identification information recognized from the first object with the map information, as the predetermined detection information obtained from the predetermined element and selects the communication unit with a communicable distance including the calculated distance.

7. An information display method that is performed in an information display terminal including a processor coupled to a memory, a camera that captures an image in a viewing direction of a wearer, a display that displays information in the viewing direction, and a plurality of types of communication units that communicate with a network or another terminal which accesses the network, the method comprising:

an information acquisition process, executed by the processor, that recognizes a first object in the image captured by the camera according to a predetermined criterion, selects a communication unit among the plurality of types of communication units on the basis of at least one of information related to the first object which is stored in advance and predetermined detection information which is obtained from a predetermined element, accesses the network or another terminal through the communication unit, and acquires the related information of the first object from the network on the basis of identification information recognized from the first object; and an information display process, executed by the processor, that, when a predetermined positional relationship between the first object and a second object is determined or specified in the image captured by the camera, displays the acquired related information of the first object in the viewing direction using the display, wherein, in the information acquisition process, the communication unit is selected among the plurality of types of communication units in an order of priority of each of the types of communication units on the basis of at least one of the information related to the first object which is stored in advance and the predetermined detection information obtained from the predetermined element.

8. The information display method according to claim 7, wherein, in the information display process, when the predetermined positional relationship between the first object and the second object in the image captured by the camera is maintained for a predetermined period of time or more, the information display terminal displays the acquired related information of the first object in the viewing direction using the display.

9. The information display method according to claim 7, wherein, in the information acquisition process, the information display terminal selects the communication unit that has a radio field intensity equal to or greater than a predetermined level among the current radio field intensities sensed by each communication unit as the predetermined detection information obtained from the predetermined element.

10. The information display method according to claim 7, wherein, in the information acquisition process, the information display terminal selects the communication unit with minimum power consumption when a remaining battery level obtained from a power management unit of the information display terminal is equal to or less than a predetermined value as the predetermined detection information obtained from the predetermined element.

11. The information display method according to claim 7, wherein the information display terminal further includes a positioning unit that measures a current position of the information display terminal and a storage unit that stores map information, and wherein, in the information acquisition process, the information display terminal calculates a distance between the current position of the information display terminal obtained from the positioning unit and a position of the first object on a map, which is specified by collating the identification information recognized from the first object with the map information, as the predetermined detection information obtained from the predetermined element and selects the communication unit with a communicable distance including the calculated distance.

12. An information display terminal comprising:
a camera that captures an image in a viewing direction of a wearer;
a display that displays information in the viewing direction;
a plurality of types of communication units that communicate with a network or another terminal which access the network; and
a processor coupled to a memory, the memory storing instructions that, when executed by the processor, configure the processor to:
recognize a first object in the image captured by the camera according to a predetermined criterion, select a communication unit among the plurality of types of communication units on the basis of at least one of information related to the first object which is stored in advance and predetermined detection information which is obtained from a predetermined element, access the network or the another terminal through the communication unit, and acquire the related information of the first object from the network on the basis of identification information recognized from the first object, and
when a predetermined positional relationship between the first object and a second object is determined or specified in the image captured by the camera, display the acquired related information of the first object in the viewing direction using the display,
wherein the processor is further configured to select the communication unit of a predetermined type from among the plurality of types of communication units on the basis of an available communication type indicated by information about a communication environment of the first object as the information related to the first object which is stored in advance.

13. The information display terminal according to claim 12,
wherein the processor is further configured to, when the predetermined positional relationship between the first object and the second object in the image captured by the camera is maintained for a predetermined period of time or more, display the acquired related information of the first object in the viewing direction using the display.

14. The information display terminal according to claim 13,
wherein the predetermined positional relationship is that a distance between the first object and the second object is within a predetermined distance or the first object and the second object are overlapped.

15. The information display terminal according to claim 12,
wherein the processor is further configured to select the communication unit that has a radio field intensity equal to or greater than a predetermined level among the current radio field intensities sensed by each communication unit as the predetermined detection information obtained from the predetermined element.

16. The information display terminal according to claim 12,
wherein the processor is further configured to select the communication unit with minimum power consumption when a remaining battery level obtained from a power management unit of the information display terminal is equal to or less than a predetermined value as the predetermined detection information obtained from the predetermined element.

17. The information display terminal according to claim 12,
wherein the information display terminal further includes a positioning unit that measures a current position of the information display terminal and a storage unit that stores map information, and
wherein the processor is further configured to calculate a distance between the current position of the information display terminal obtained from the positioning unit and a position of the first object on a map, which is specified by collating the identification information recognized from the first object with the map information, as the predetermined detection information obtained from the predetermined element and select the communication unit with a communicable distance including the calculated distance.

18. An information display terminal comprising:
a camera that captures an image in a viewing direction of a wearer;
a display that displays information in the viewing direction;
a plurality of types of communication units that communicate with a network or another terminal which access the network; and
a processor coupled to a memory, the memory storing instructions that, when executed by the processor, configure the processor to:
recognize a first object in the image captured by the camera according to a predetermined criterion, select a communication unit among the plurality of types of communication units on the basis of at least one of information related to the first object which is stored in advance and predetermined detection information which is obtained from a predetermined element, access the network or the another terminal through the communication unit, and acquire the related information of the first object from the network on the basis of identification information recognized from the first object, and
when a predetermined positional relationship between the first object and a second object is determined or specified in the image captured by the camera, display the acquired related information of the first object in the viewing direction using the display,
wherein the processor is further configured to select the communication unit from among the plurality of types of communication units in an order of priority of each of the types of communication units on the basis of at least one of the information related to the first object which is stored in advance and the predetermined detection information obtained from the predetermined element.

19. The information display terminal according to claim 18,
wherein the processor is further configured to, when the predetermined positional relationship between the first object and the second object in the image captured by the camera is maintained for a predetermined period of time or more, display the acquired related information of the first object in the viewing direction using the display.

20. The information display terminal according to claim 18,
    wherein the processor is further configured to select the communication unit that has a radio field intensity equal to or greater than a predetermined level among the current radio field intensities sensed by each communication unit as the predetermined detection information obtained from the predetermined element.

21. The information display terminal according to claim 18,
    wherein the processor is further configured to select the communication unit with minimum power consumption when a remaining battery level obtained from a power management unit of the information display terminal is equal to or less than a predetermined value as the predetermined detection information obtained from the predetermined element.

22. The information display terminal according to claim 18,
    wherein the information display terminal further includes a positioning unit that measures a current position of the information display terminal and a storage unit that stores map information, and
    wherein the processor is further configured to calculate a distance between the current position of the information display terminal obtained from the positioning unit and a position of the first object on a map, which is specified by collating the identification information recognized from the first object with the map information, as the predetermined detection information obtained from the predetermined element and select the communication unit with a communicable distance including the calculated distance.

* * * * *